United States Patent
Rager et al.

(10) Patent No.: US 7,603,120 B2
(45) Date of Patent: Oct. 13, 2009

(54) METHOD AND APPARATUS FOR COMMUNICATIONS NETWORK MANAGEMENT

(75) Inventors: Kent D. Rager, Gurnee, IL (US); Marcia J. Otting, Mundelein, IL (US); David J. Theobald, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 609 days.

(21) Appl. No.: 11/127,547

(22) Filed: May 12, 2005

(65) Prior Publication Data

US 2006/0258349 A1 Nov. 16, 2006

(51) Int. Cl.
*H04W 4/00* (2006.01)
(52) U.S. Cl. .................. 455/433; 455/434; 455/435.2
(58) Field of Classification Search .......... 455/433, 455/434, 435.1, 435.2, 558, 432.1, 436, 448
See application file for complete search history.

(56) References Cited

U.S. PATENT DOCUMENTS

| | | | |
|---|---|---|---|
| 6,684,082 B1 | 1/2004 | McClure | |
| 2002/0147012 A1* | 10/2002 | Leung et al. | 455/433 |
| 2004/0087305 A1* | 5/2004 | Jiang et al. | 455/432.1 |
| 2004/0158618 A1 | 8/2004 | Shaw | |
| 2004/0185846 A1 | 9/2004 | Beere | |
| 2004/0192306 A1* | 9/2004 | Elkarat et al. | 455/435.2 |
| 2005/0176466 A1* | 8/2005 | Verloop et al. | 455/558 |

FOREIGN PATENT DOCUMENTS

| | | |
|---|---|---|
| EP | 1463366 A2 | 9/2004 |
| GB | 2378094 A | 1/2003 |
| GB | 2378098 A * | 1/2003 |

OTHER PUBLICATIONS

UTSTARCOM; "Total Control 2000 Wireless Access Platform" 2003.

* cited by examiner

*Primary Examiner*—Melur Ramakrishnaiah
(74) *Attorney, Agent, or Firm*—Gary J. Cunningham

(57) ABSTRACT

A method in a communication device (106) comprises registering (202) on a first network (102), identified by a first network ID, stored in the communication device. Then receiving, from the service provider, an acting network ID which identifies a second network (104). Storing the acting network ID on the communication device and reprioritizing the second network, identified by the received acting network ID, as the home network. The communication device then registers on the second network in response to the reprioritizing the second network.

15 Claims, 4 Drawing Sheets

METHOD AND APPARATUS FOR COMMUNICATIONS NETWORK MANAGEMENT

FIELD OF THE INVENTIONS

The present inventions relate generally to communications networks, and more particularly to a method for managing network resources.

BACKGROUND OF THE INVENTIONS

As a result of wireless network operator consolidations, there are situations where a single service provider may be operating multiple networks within the same geographic area. The service provider may wish to configure communication devices the same for both networks in order to obtain efficiencies of scale. In such a situation, if the communication device identifies one of these two networks as the home network, then all of the communication devices will attempt to obtain service on just one of the available networks. It is desirable to flexibly balance the loading of communications devices across the multiple networks.

The various aspects, features and advantages of the present inventions will become more fully apparent to those having ordinary skill in the art upon careful consideration of the following Detailed Description of the Drawings with the accompanying drawings described below.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
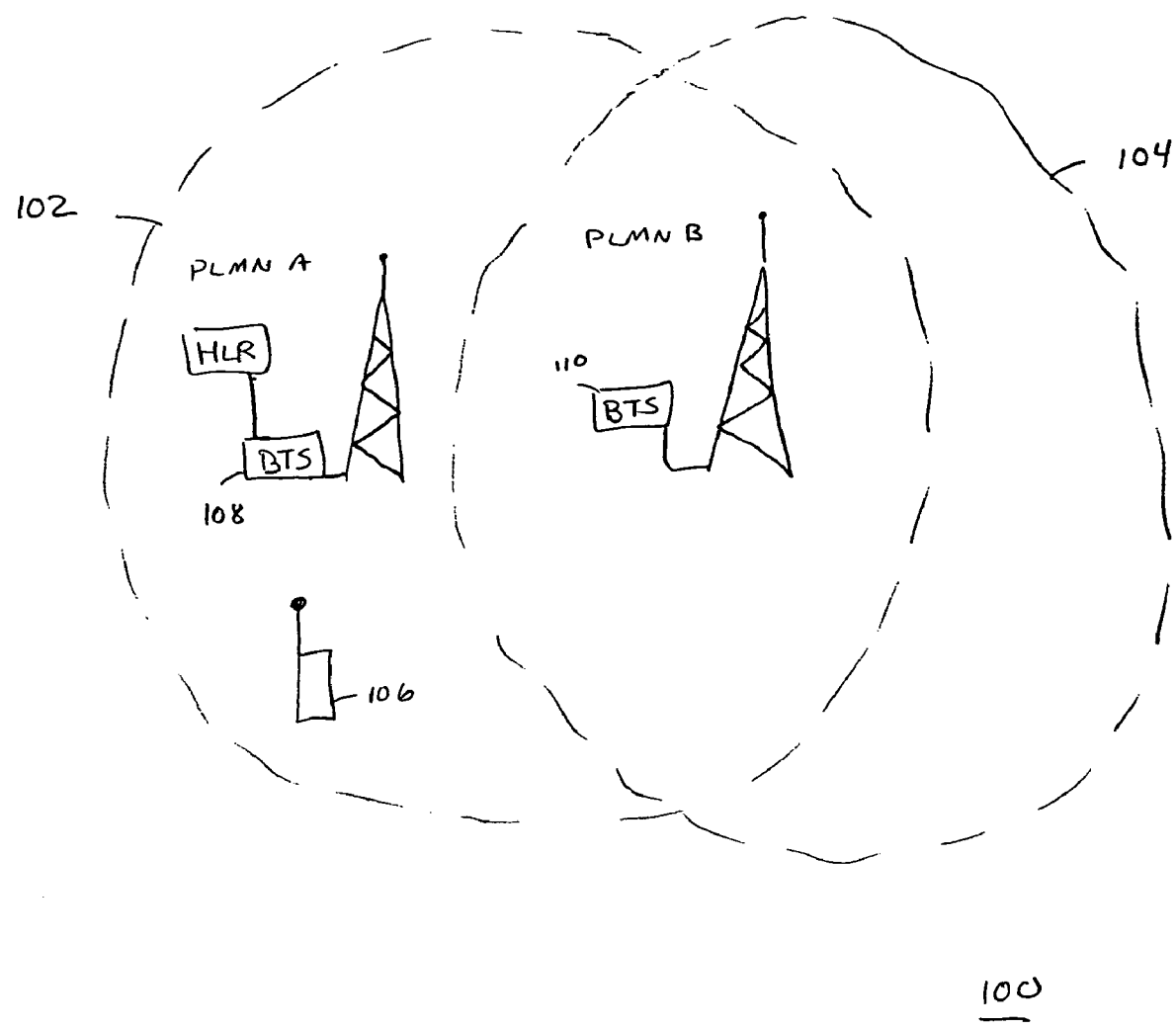
FIG. 1 is an exemplary wireless communications system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail exemplary embodiments that are in accordance with the present invention, it should be observed that the embodiments reside primarily in combinations of method steps and apparatus components related to network management. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

A method and apparatus for network management is disclosed. The method comprises registering a communication device on a first network identified by a first network ID stored in the communication device. Then receiving an acting network ID that identifies a second network from the service provider. Next, storing the acting network ID on the communication device; and then reprioritizing the second network, identified by the received acting network ID, as having a higher priority during the registration process than the first network. The communication device 106 then registers on the second network 104. The communication device may be a mobile communication device or wireless communication device.

FIG. 1 illustrates an exemplary communications system 100. The communications system includes at least a first network 102 and a second network 104. The first network 102 is identified by a first network ID and the second network 104 is identified by a second network ID. In this exemplary embodiment, the first network 102 is referred to as a public land mobile network (PLMN). In this exemplary embodiment, the first network 102 is a home network to at least first communication device 106. The second network 104 is also a PLMN in this exemplary embodiment. The PLMN networks are exemplary only and it is to be understood that other network types, in any combination, may take the place of the exemplary PLMNs. For example, the first network may be a wireless local area network (WLAN) while the second network remains a PLMN. The exemplary embodiment shown includes two networks for exemplary purposes however it is to be understood that more then two networks, network types, or combination thereof may be included as part of the communication system.

The geographical coverage of each network in the communication system may overlap, have substantially the same geographical coverage area or not overlap at all. FIG. 1 illustrates an exemplary wireless communications network in the form of a Global System for Mobile communications (GSM) network 100 supporting wireless communications for mobile wireless communication devices, for example, communication device 106, also referred to herein as a communications device, user equipment, mobile station or user terminal. The mobile wireless communications device may be a wireless cellular telephone, or a two-way pager, or a wireless enabled personal digital assistant (PDA) or notebook or laptop computer, PC card or some other radio communications device, any of which may be a cellular communications service subscriber device.

The communication system is an exemplary wireless communication system such as a GSM communication system which may be referred to as radiotelephone communications system. The GSM communications system 100 architecture of FIG. 1 is only an exemplary embodiment and not intended to limit the invention. The exemplary network 102, 104 generally includes a plurality of base-station transceivers (BTS) that communicate with a Radio Access Network (RAN), which communicates with a Serving GPRS Switching Node (SGSN). The SGSN is communicably coupled to a Gateway GPRS Support Node (GGSN) which is communicably coupled to a Home Location Register (HLR) 108, 110 and a gateway all of which form a Public Land Mobile Network (PLMN) 102 which may be coupled to a packet data network (PDN) (e.g. the internet). A mobile switching center (MSC) is couple to the HLR, VLR and the RAN. The MSC of the first network may also be coupled to the MSC of the second network. These and other aspects of GSM and other communications network architectures are known generally. The communication device 106 in this exemplary embodiment communicates with the exemplary network through at least one of the BTS. The communication device 106 may be communicating with one of the plurality of BTS which are a part of the PLMN 102 or PLMN 104. The MS 110 may be communicating with multiple BTS's simultaneously such as in a code division multiple access (CDMA) system.

The invention applies more generally to any communications network that provide communications access to communications devices, including, for example, Third Generation (3G) Universal Terrestrial Radio Access Network (UTRAN), Fourth Generation communications networks, and among other existing and future communications network and systems. These and other networks may provide the communication link to communications devices in order to manage the network, including network load balancing. For example, the MS 110 may be communicating with a wireless local area network (WLAN) such as an 802.11 access point or the like or a wide area network (WAN) such as the cellular radiotelephone networks, WiMax (802.16) or the like. The communication network may also be a CDMA WCDMA, UMTS, WiMAX (082.16) network or pico-nets, personal area networks (PANS) or the like.

Figure 2:
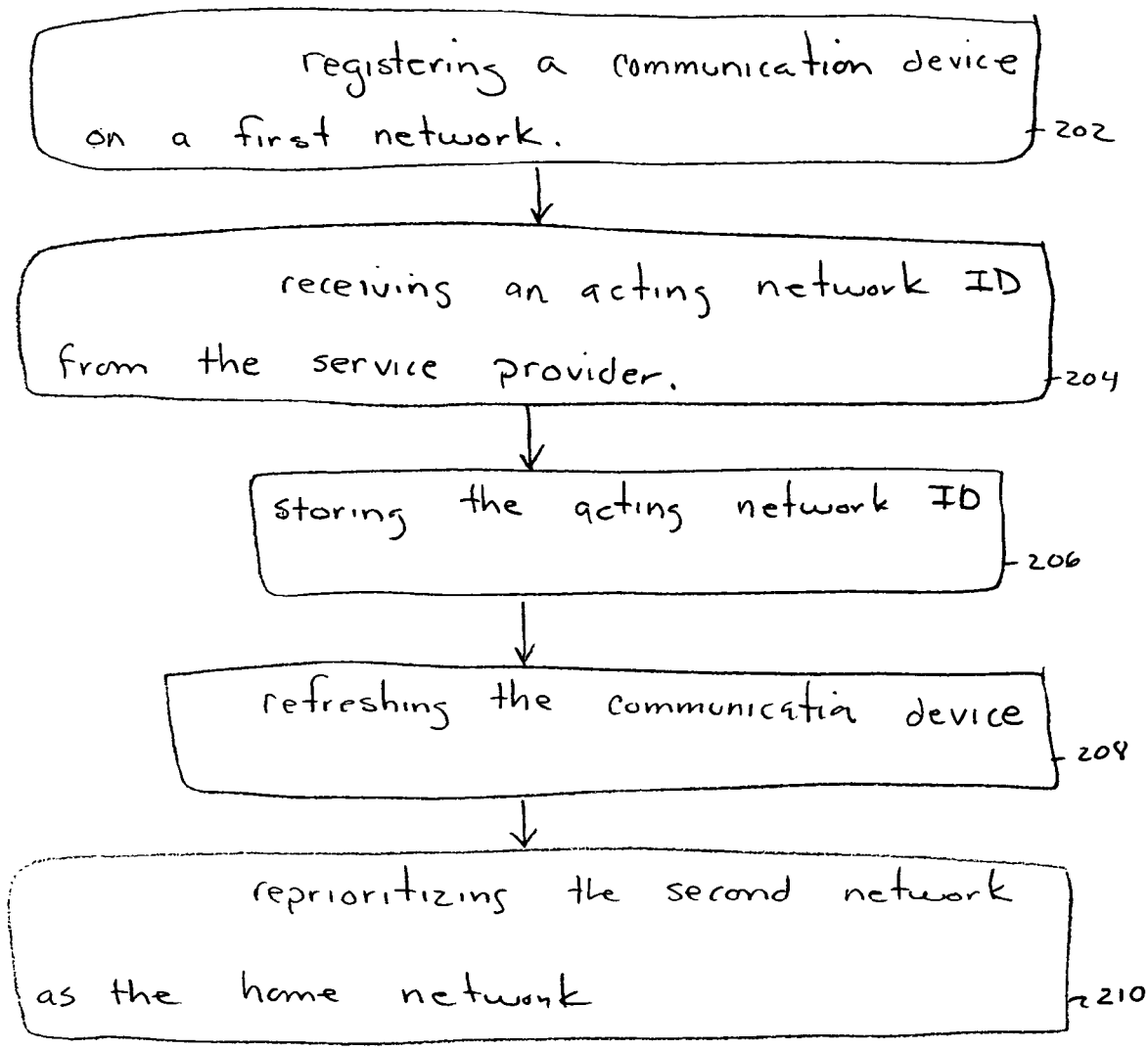
FIG. 2 is an exemplary flow diagram for network management.

FIG. 2 illustrates an exemplary flow diagram for the method of allocating a mobile station to a desired network. The method in the communication device 106 comprises registering 202, by transmitting a request by a transmitter of the communication device 106, on the first network 102 identified by a first network ID stored in a memory of the communication device 106. In this exemplary embodiment, the first network 102 is the home network identified by the international mobile subscriber identity (IMSI). Then receiving 204 an acting network ID that identifies the second network 104 from the service provider. In this exemplary embodiment, this is the acting home network ID. Next, storing 206 the acting home network ID in a memory of the communication device 106, refreshing 208 the communication device 106 and reprioritizing 210 the second network 104, identified by the acting home network ID as the home network. Refreshing 208 the communication device 106 at least comprises initiating or re-initiating the registration process. This may occur on power-up of the device or automatically upon receipt and storage of the acting network ID. The device 106 may release from the first network 102 and prepare to re-register.

Reprioritizing 210 the second network comprises assigning a higher priority to the acting network ID then the home network ID. Network priority assignment is known and may be carried out in various manners known to those skilled in the art.

Now the communication device 106 will register with the second network 104, as the second network 104 takes priority over the home network identified by the IMSI. The communication device 106 reprioritizes the second network 104, giving it higher priority than the first network or home network even though the IMSI indicates that the first network 102 is the home network. During registration with the second network 104, the communication device 106 in one exemplary embodiment will use the IMSI to identify the subscriber attempting to register on the second network 104.

When searching for a network to register with and subsequently exchange communications with, some communications devices have a list of potential networks and a set of rules for prioritizing the search order. The networks of the list of potential networks are each identified by a network ID and each network ID is given a priority. In one exemplary embodiment, the set of rules gives the highest priority to the last selected network. This is the network in which the communication device 106 was last registered. Following the last selected network, priority is given to the home network. Following, the home network, a PLMN selector determines the priorities of the next set of network IDs. The PLMN selector is followed in priority by randomly picking a network from a set of networks having a signal strength above a predetermined threshold signal strength. Finally selecting the network with the greatest signal strength.

In this exemplary embodiment, when searching for a network to register with, such as when the device 106 is turned on, the communication device 106 will attempt to register on the second network 104 prior to attempting to register on the home network identified by the IMSI. The acting home network ID takes priority over the home network when the acting home network ID is present on, and valid, the communication device 106 or memory coupled thereto.

In this exemplary embodiment, until the acting network ID is reprogrammed or removed from the memory, the communication device 106 will continue to camp on the second network 104 with which it is registered, provided that the second network 104 is available. The service provider may choose to reprogram the acting home network ID to another value indicating the third network (not shown) is to take priority to the first network. This allows the service provider to allocate communications devices to a desired network of a plurality of networks and balance the number of devices per network. The acting network ID can be reprogrammed as the service provider desires.

In one exemplary embodiment, the communication device 106 receives the acting network ID over the first network from the service provider. In the exemplary GSM communication system, a first network BTS will transmit with a transmitter the acting network ID to the communication device. In another exemplary communications system, a second network transmitter transmits the acting network ID to the communication device 106.

The acting network ID may be sent over the first network 102 or the second network 104 or the third network (not shown). The acting network ID or message containing the acting network ID, may be communicated via a short message service message (SMS) to the device 106. Other communication channels of the communication system 100 may be used to communicate the acting network ID are generally known to those of ordinary skill in the art.

In another exemplary embodiment the acting network ID is preprogrammed into the device or the device's memory. In this exemplary embodiment, the acting network ID may be reprogrammed either over the air or by the service provider, at the service provider location for example.

In one exemplary embodiment, the memory is a removable memory such as an exemplary subscriber identity module (SIM). The SIM is used to store at least a first data set, which is the IMSI in one exemplary embodiment, and a second data set which is the acting network ID. SIM cards can be distributed by the service provider to subscribers wherein the first data set is a valid IMSI and the second data set is a null value. When the acting network ID has a null value, the communication device 106 will give priority to the home network identified in the IMSI. The null value may later be replaced with a valid second data set, the acting network ID in this exemplary embodiment, received from the service provider as discussed above.

In this exemplary embodiment, the communication device 106 will retrieve the first data set from memory. The communication device 106 registers on a first network identified by the first data set. The device 106 receives a second data set from the service provider. The device 106 gives the second data set higher priority than the first data set. Then the device 106 registers on a network identified by the second data set if the second data set is not equal to a null value. The device registers on a network identified by the first data set if the second data set is a null value. The second data set may be received from the first network, the second network 104 or a third network (not shown). The second data set may then be stored and retrieved from the memory of the device 106 such as the exemplary SIM. It is to be understood that a SIM is one form of removable memory. It is anticipated that any form of removable memory may be used to store the first network ID, the acting network ID or any configuration thereof. Examples of other removable memory include USB drive, micro-drives, hard drive, tape drive or the like.

In one exemplary embodiment, when the memory is the SIM, and the acting network ID is received via an SMS message, the SMS message may be a SIM specific SMS message indicating that the information in the SMS message is to be received by or stored in the SIM. The first network ID and the acting network ID may be both stored and retrieved from the SIM.

A service provider operating a plurality of networks may allocate a plurality of communications devices to one or more of the plurality of networks. In one exemplary embodiment, the SIM is used to provide the subscriber with an IMSI by the service provider. The SIM includes an acting home network ID with a null set, i.e. FF, FF, FF. When the communication device 106 with the SIM begins the registration process the network receives a registration request from communication device 106, wherein the subscriber is identified by the IMSI, which is a request to register on the first network 102, which is the home network in this exemplary embodiment. The first network 102 determines that the communication device 106 is to be registered on a second network 104 and sends to the communication device 106 an acting network ID, indicating to the communication to register on the second network. The communication device 106 registers on the second network 104 with the international mobile subscriber identity. In another exemplary embodiment, the communication device registers on the second network 104 with a temporary mobile subscriber identity (TMSI). The TMSI may be issued to the communication device by the first network 102.

An entity of the service provider, which may reside in the first network 102, second network 104 or independent therefrom, determines whether to send the communication device 106 an acting network ID and which acting network ID of the plurality of networks to send. In one exemplary embodiment, this function is carried out by the Home Location Register (HLR) of one of the first network 102 or the second network 104.

Figure 3:
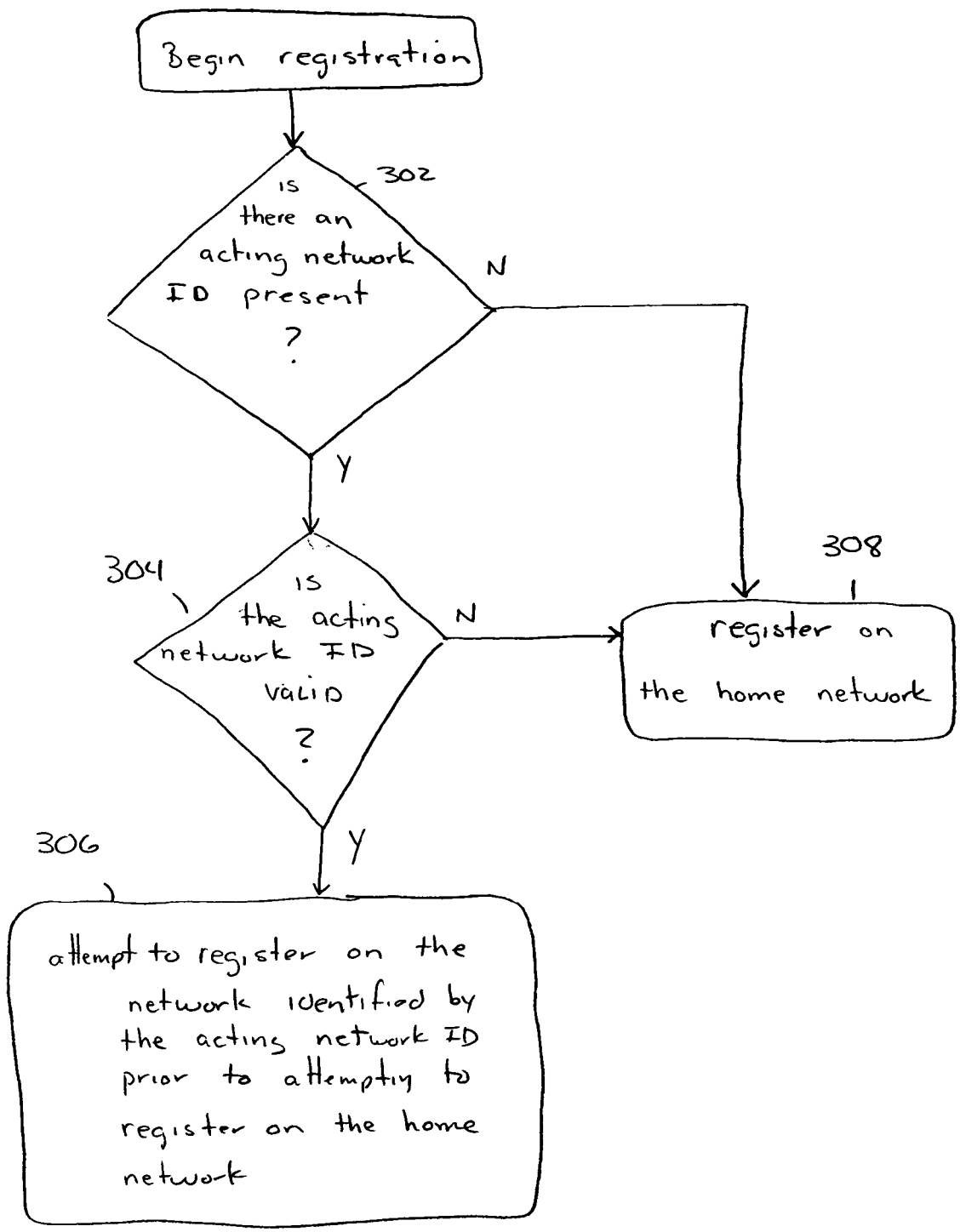
FIG. 3 is an exemplary flow diagram for network management.

FIG. 3 illustrates an exemplary flow diagram for allocating the communication device to a second network 106. The communication device 106 determines 302 if there is an acting network ID present in the communication device 106. If there is an acting network ID, the device 106 determines 304 if the acting network ID is valid and not equal to the null set. When the device 106 determines there is a valid acting network ID, then the device will attempt to register 306 on the network identified by the acting network ID prior to attempting to register on the home network identified by the IMSI. If the acting network ID is not present on the device or not valid, the device attempt to register 308 on the first network or home network in this exemplary embodiment.

The communication device comprises a memory for storing the network information, which includes the first network ID (IMSI) and the acting home network ID. The device 106 further includes a controller coupled to the memory and a network priority determining module for determining if the acting network identifier is present and valid.

Figure 4:
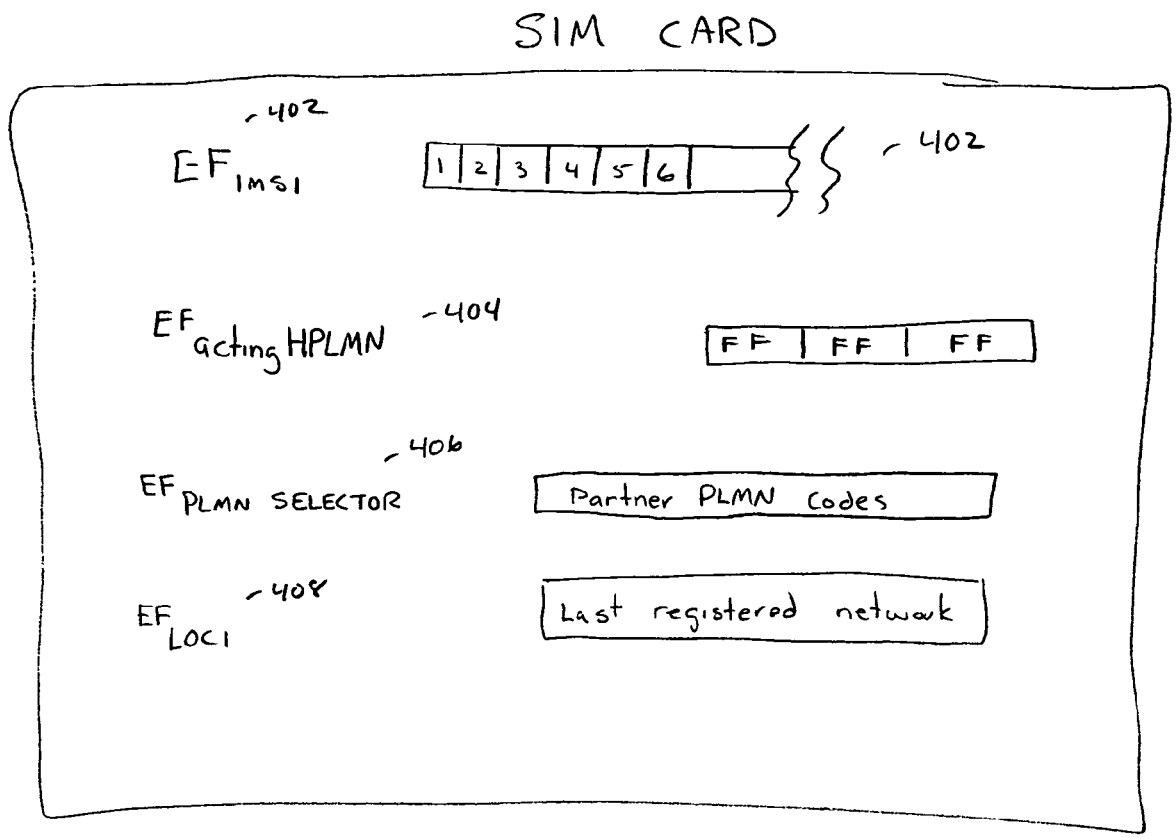
FIG. 4 is an exemplary removable memory card.

An exemplary removable memory card is illustrated in FIG. 4. In this exemplary embodiment, a SIM card 400 is shown having an international mobile subscriber identity 402 and an acting home public land mobile network identity 404. The SIM card may also include a public land mobile selector 406, a last registered network indicator 408 or the like. It is to be understood that this information may be stored in any memory coupled to the communicator device 106 and the SIM card is exemplary and is not to be limited thereto.

In one exemplary embodiment, the communication device will frequently scan for the home network when the device is not registered on the home network, generally referred to as roaming. In this embodiment, when the device has registered to the second network 104 identified by the acting network ID, the device 106 will not perform home network scans as the acting network ID has taken the place of the home network ID. The communication device 106 recognizes the acting network ID as the home network such that the device will not perform home network scans thereby reducing current drain.

While the present inventions and what are considered presently to be the best modes thereof have been described sufficiently to establish possession by the inventors and to enable those of ordinary skill to make and use the inventions, it will be understood and appreciated that there are equivalents to the exemplary embodiments disclosed herein and that many modifications and variations may be made thereto without departing from the scope and spirit of the inventions, which are to be limited not by the exemplary embodiments but by the claims appended hereto.

What is claimed is:

1. A method of registering a wireless communication device in multiple wireless networks comprising:
   registering on a first network identified by a first network ID stored in the communication device, the first network provided by a service provider;
   receiving an acting network ID that identifies a second network from the service provider based on the registering;
   storing the acting network ID on the communication device; and
   reprioritizing the second network, identified by the received acting network ID, as the home network.

2. The method of claim 1, further comprising refreshing the communication device.

3. The method of claim 1, further comprising registering on the second network in response to reprioritizing the second network.

4. The method of claim 1, further comprising registering on the home network identified by the first network ID.

5. The method of claim 1, further comprising retrieving the first network ID from a removable memory card coupled to the communication device.

6. The method of claim 1, further comprising storing the acting network ID on a removable memory card.

7. The method of claim 1, further comprising receiving the acting network ID over the first network from the service provider.

8. The method of claim 1, further comprising receiving the acting network ID over the second network from the service provider.

9. The method of claim 1, further comprising receiving the acting network ID in a short message service message.

10. A method of registering a wireless communication device in multiple wireless networks comprising:
    retrieving a first data set from a home network ID file.
    registering on a first network identified by the first data set;

receiving a second data set from a service provider based on the registering;

giving the second data set higher priority than the first data set; and registering the wireless communication device on a network identified by the second data set if the second data set is not equal to a null value.

11. The method of claim 10, further comprising registering the wireless communication device on a network identified by the first data set if the second data set is a null value.

12. The method of claim 10, further comprising receiving the second data set from a first network.

13. The method of claim 10, further comprising retrieving the home network ID and the acting programmable network ID from a subscriber identity module of the communication device.

14. A wireless communication device for registering in multiple wireless communication networks comprising:

a memory means for storing network information, the memory means storing a home network identifier; and an acting network identifier;

a controller means coupled to the memory means, the controller means configured to receive an acting network identifier from a service provider based on a registration request;

a network priority determining means for determining if the acting network identifier is valid.

15. A method of registering a wireless communication device in multiple wireless networks comprising:

registering on a first network identified by a first network ID stored in the communication device;

receiving an acting network ID that identifies a second network from the service provider based on the registering;

storing the acting network ID on the communication device; and recognizing the acting network ID as the home network such that the device will not perform home network scans.

* * * * *